3 Sheets—Sheet 1.

T. G. SAINT.
CLOTHES-DRIER.

No. 170,495. Patented Nov. 30, 1875.

WITNESSES
E. J. Joyner
D. W. Dow

INVENTOR
Thomas G. Saint
J. C. Lathrop ATTORNEY

N. PETERS, PHOTO-LITHOGRAPHER, WASHINGTON, D.C.

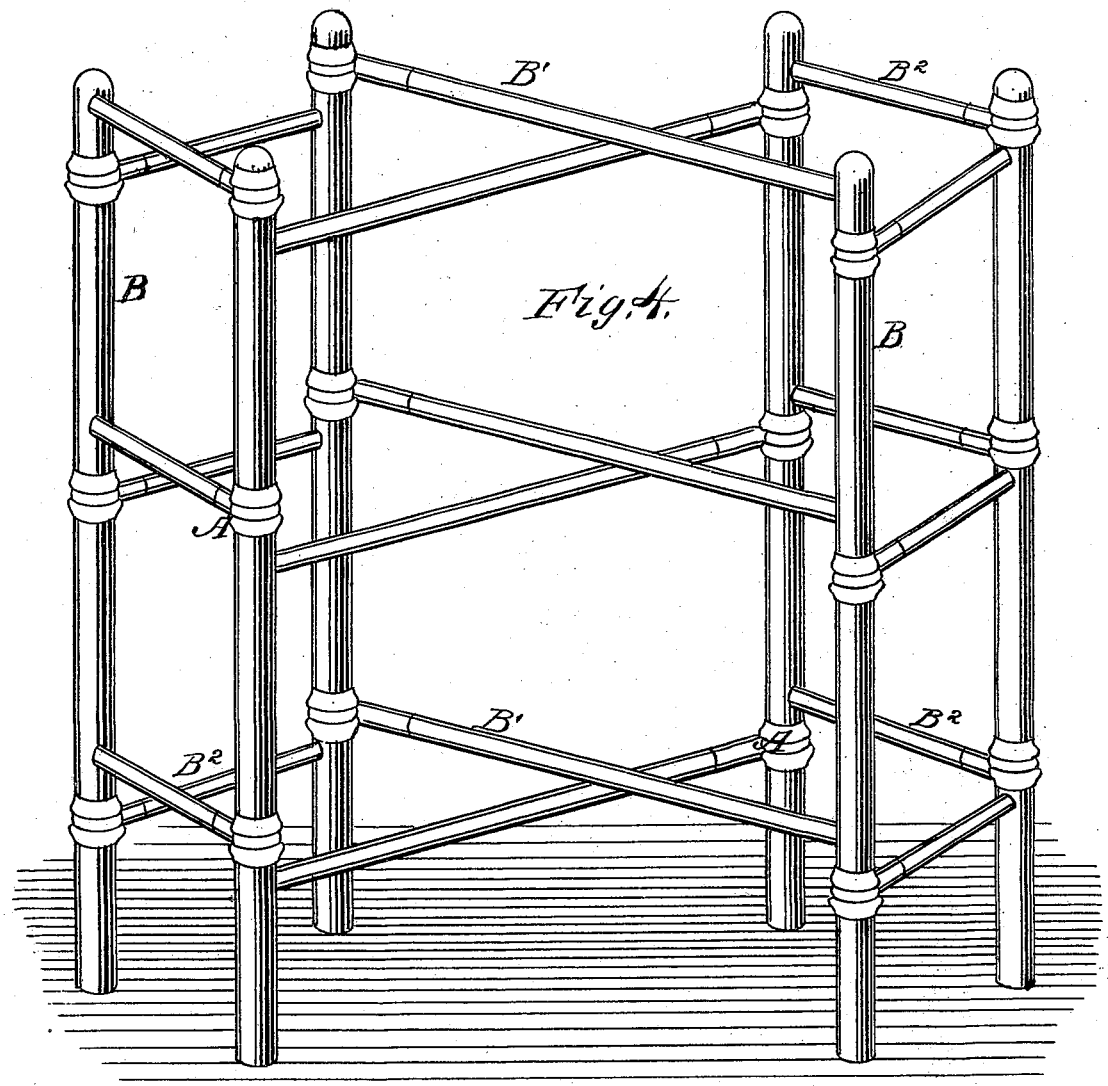

T. G. SAINT.
CLOTHES-DRIER.
No. 170,495. Patented Nov. 30, 1875.
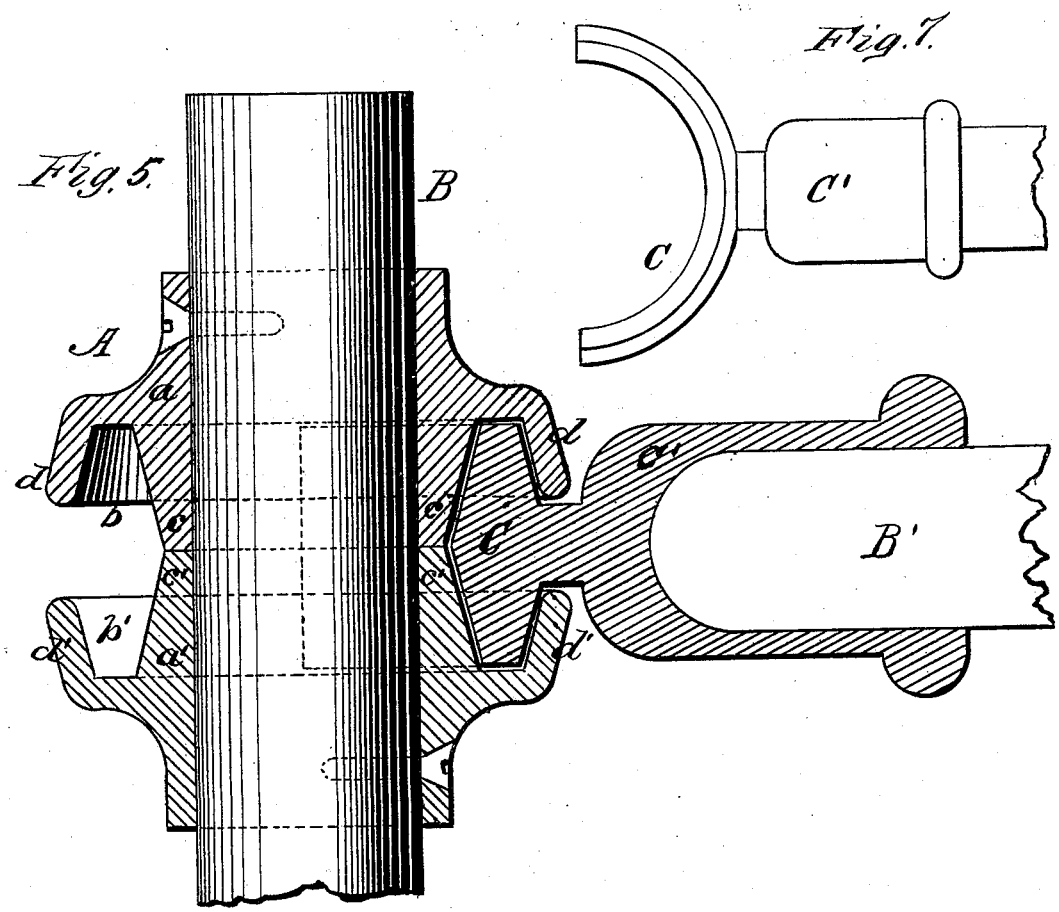
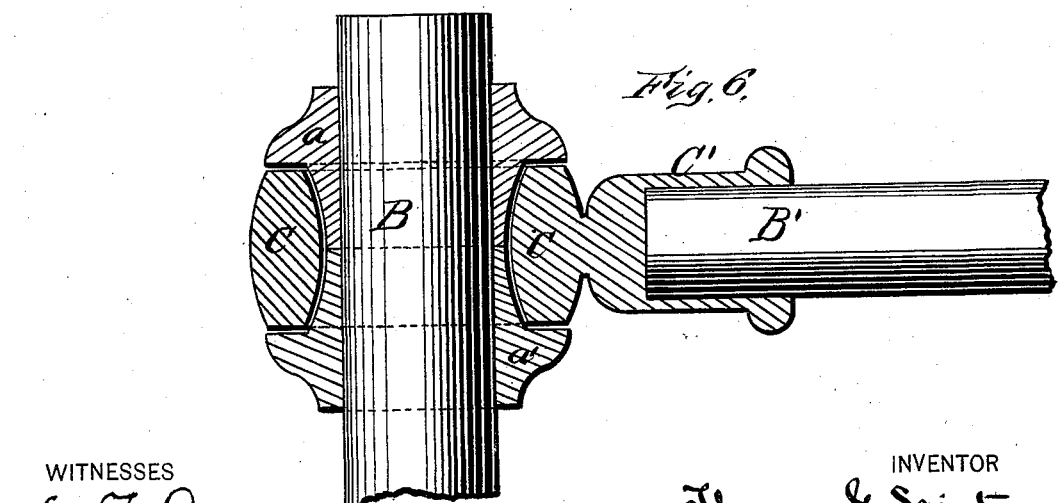
WITNESSES
INVENTOR
Thomas G. Saint
ATTORNEY

UNITED STATES PATENT OFFICE.

THOMAS G. SAINT, OF SHARPSBURG, PENNSYLVANIA.

IMPROVEMENT IN CLOTHES-DRIERS.

Specification forming part of Letters Patent No. 170,495, dated November 30, 1875; application filed June 14, 1875.

*To all whom it may concern:*

Be it known that I, THOMAS G. SAINT, of Sharpsburg, in the county of Allegheny and State of Pennsylvania, have invented certain new and useful Improvements in Clothes-Driers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to that class of inventions known as clothes-driers chiefly, and consists in the peculiar and novel construction of parts adapted to be used as a hinge for the purpose of adjusting the frame of clothes-driers, towel-racks, and the like, as will be hereinafter more fully described.

Figure 2:
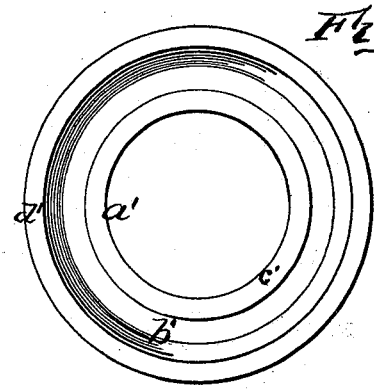
Figure 1:
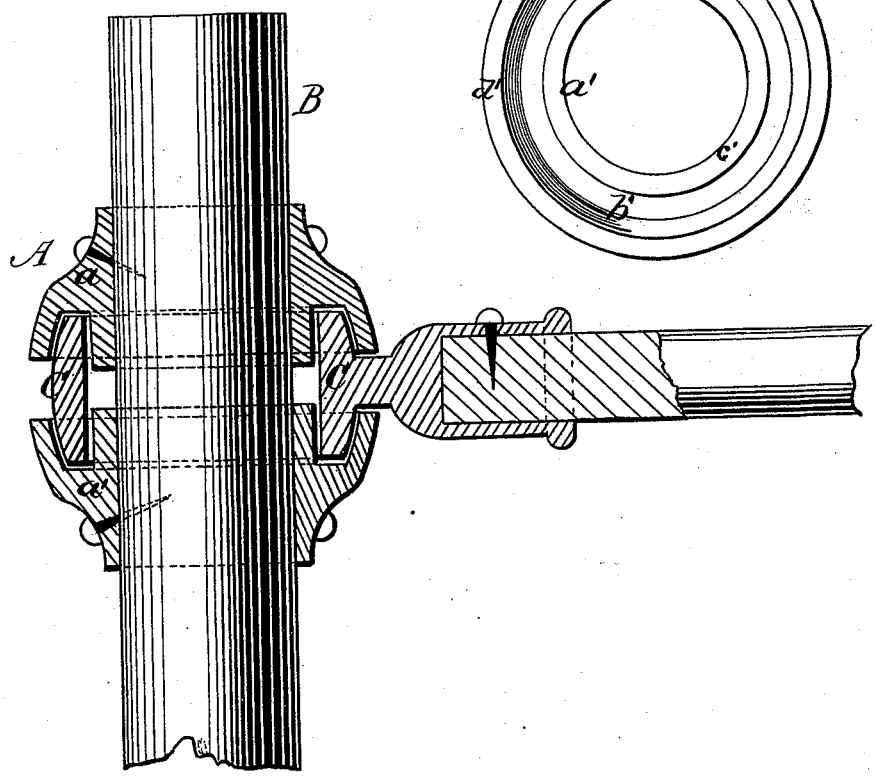
Figure 3:
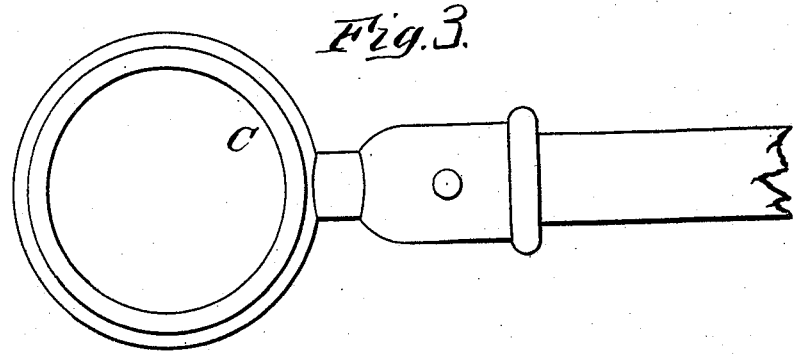

Figure 1 represents a vertical section of the hinge attached to the post. Fig. 2 is a top view of one of the cups of the hinge detached. Fig. 3 is a top view of the coupling detached. Fig. 4 is a perspective view of the drier with hinges attached. Figs. 5 and 6 are vertical sectional views, and Fig. 7 is a top or plan view of the coupling-ring made in half-circle.

Referring to the annexed drawings, A designates my improved coupling or hinged joint, which is composed of three parts, $a\ a\ C$, of a circular form, for the purpose of giving a free circular movement to the extended arms $B^1\ B^2$, thus allowing the arms to travel the entire circle, as shown in Figs. 1, 2, and 3. Cups $a\ a'$ are formed with projecting lips or flanges $d\ d'$ on their outer edges, and collars $c\ c'$ on their inner edges, said lips and collars extending entirely around or in the cups, and made a part thereof. The lips $d\ d'$ are for the purpose of keeping the ring or coupling C in its proper place, thus preventing it from being detached from the cups or post B, and at the same time prevents the bars from sagging, as shown more clearly in Fig. 5. The collar $c$ on the inner edge is formed for the purpose of preventing the coupling-ring C from wearing away the post. Between the collars $c\ d$ is formed a V or other shaped groove or gutter, $b\ b'$, for the reception of a corresponding ring or coupling, C. Said ring, being of a similar form, fits into and plays loosely therein, to allow the same to be adjusted at any desired angle.

These coupling-rings may extend partly around the post, or they may encircle entirely around the same. In either case the lips $d\ d'$ will prevent the coupling-ring from being displaced, as shown in Figs. 1 and 5.

When the full circular ring or coupling is used, lips $d\ d'$ may be dispensed with, as shown in Fig. 6.

At the extreme end the ring or coupling C is provided with a socket, $C'$, for the purpose of receiving the extending arms $B^1\ B^2$, said arms being rigidly secured to the post B directly opposite the coupling A, as shown in Fig. 4. The extended arms $B^1$ are made longer than the arms $B^2$, to allow more space for the goods to hang on. The upper and lower cups are secured to the post by any well-known means that will allow of their adjustability, so that the arms may be easily shifted, as may be required.

I do not confine myself to the particular form of grooves or gutters in plates or cups $a\ a'$, but prefer to have them made as shown.

Having thus fully described my invention, what I claim as new, and desire to secure by Letters Patent, is—

The combination of a clothes-drier hinge, A, provided with collars $c\ c'$, lips $d\ d'$, having groove $b\ b'$, said groove being of a V or other shape, as shown, with circular or semicircular ring C, all constructed, arranged, and operating as shown and described.

In testimony that I claim the foregoing as my own I herewith affix my signature in presence of two witnesses.

THOMAS G. SAINT.

Witnesses:
GEORGE WANNER,
JAS. O. POST.